United States Patent
Karunakaran et al.

(10) Patent No.: US 11,784,922 B2
(45) Date of Patent: Oct. 10, 2023

(54) SCALABLE OVERLAY MULTICAST ROUTING IN MULTI-TIER EDGE GATEWAYS

(71) Applicant: VMware, Inc., Palo Alto, CA (US)

(72) Inventors: Senthilkumar Karunakaran, Santa Clara, CA (US); Subin Cyriac Mathew, San Jose, CA (US); Stephen Tan, San Jose, CA (US); Meenakshi Sundaram Selvaraj, Pleasanton, CA (US); Chidambareswaran Raman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/367,347

(22) Filed: Jul. 3, 2021

(65) Prior Publication Data
US 2023/0006922 A1    Jan. 5, 2023

(51) Int. Cl.
*H04L 45/42* (2022.01)
*H04L 47/80* (2022.01)
(Continued)

(52) U.S. Cl.
CPC .......... *H04L 45/42* (2013.01); *H04L 12/4633* (2013.01); *H04L 45/02* (2013.01); *H04L 47/806* (2013.01)

(58) Field of Classification Search
CPC ..... H04L 45/42; H04L 12/4633; H04L 45/02; H04L 47/806
See application file for complete search history.

(56) References Cited

U.S. PATENT DOCUMENTS

| 5,224,100 A | 6/1993 | Lee et al. |
| 5,331,634 A | 7/1994 | Fischer |

(Continued)

FOREIGN PATENT DOCUMENTS

| CN | 101119578 A | 2/2008 |
| CN | 101783734 A | 7/2010 |

(Continued)

OTHER PUBLICATIONS

Casado, Martin, et al. "Ethane: Taking Control of the Enterprise," SIGCOMM 07, Aug. 27-31, 2007, 12 pages, ACM, Kyoto, Japan.

(Continued)

*Primary Examiner* — Chris Parry
*Assistant Examiner* — Dixon F Dabipi
(74) *Attorney, Agent, or Firm* — ADELI LLP

(57) ABSTRACT

A method for offloading multicast replication from multiple tiers of edge nodes implemented by multiple host machines to a physical switch is provided. Each of the multiple host machines implements a provider edge node and a tenant edge node. One host machine among the multiple host machines receives a packet having an overlay multicast group identifier. The host machine maps the overlay multicast group identifier to an underlay multicast group identifier. The host machine encapsulates the packet with an encapsulation header that includes the underlay multicast group identifier to create an encapsulated packet. The host machine forwards the encapsulated packet to a physical switch of the network segment. The physical switch forwards copies of the encapsulated packet to tenant edge nodes at one or more ports that are determined to be interested in the underlay multicast group identifier.

21 Claims, 9 Drawing Sheets

(51) Int. Cl.
*H04L 12/46* (2006.01)
*H04L 45/02* (2022.01)

(56) References Cited

U.S. PATENT DOCUMENTS

| | | | |
|---|---|---|---|
| 5,729,685 A | 3/1998 | Chatwani et al. | |
| 5,831,975 A | 11/1998 | Chen et al. | |
| 5,926,463 A | 7/1999 | Ahearn et al. | |
| 6,018,526 A | 1/2000 | Liu et al. | |
| 6,104,699 A | 8/2000 | Holender et al. | |
| 6,181,697 B1 | 1/2001 | Nurenberg et al. | |
| 6,192,417 B1 | 2/2001 | Block et al. | |
| 6,728,777 B1 | 4/2004 | Lee et al. | |
| 6,804,263 B1 | 10/2004 | Okawa | |
| 6,836,481 B1 | 12/2004 | Hotta | |
| 6,862,263 B1 | 3/2005 | Simmons | |
| 6,901,510 B1 | 5/2005 | Srivastava | |
| 6,917,985 B2 | 7/2005 | Madruga et al. | |
| 6,934,252 B2 | 8/2005 | Mehrotra et al. | |
| 6,950,428 B1 | 9/2005 | Horst et al. | |
| 7,046,630 B2 | 5/2006 | Abe et al. | |
| 7,209,439 B2 | 4/2007 | Rawlins et al. | |
| 7,286,490 B2 | 10/2007 | Saleh et al. | |
| 7,333,487 B2 | 2/2008 | Novaes | |
| 7,529,199 B1 | 5/2009 | Wijnands et al. | |
| 7,606,187 B2 | 10/2009 | Zeng et al. | |
| 7,792,099 B2 | 9/2010 | Yasukawa et al. | |
| 7,792,987 B1 | 9/2010 | Vohra et al. | |
| 7,813,340 B2 | 10/2010 | Novaes | |
| 7,876,754 B2 | 1/2011 | Novaes | |
| 7,937,438 B1 | 5/2011 | Miller et al. | |
| 7,940,685 B1 * | 5/2011 | Breslau | H04L 43/0858 709/224 |
| 7,961,646 B2 | 6/2011 | Liu et al. | |
| 8,089,964 B2 | 1/2012 | Lo et al. | |
| 8,223,649 B2 | 7/2012 | Rangarajan et al. | |
| 8,224,971 B1 | 7/2012 | Miller et al. | |
| 8,310,957 B1 | 11/2012 | Rekhter | |
| 8,312,129 B1 | 11/2012 | Miller et al. | |
| 8,391,185 B2 | 3/2013 | Wijnands et al. | |
| 8,553,689 B2 | 10/2013 | Bachmann et al. | |
| 8,612,627 B1 | 12/2013 | Brandwine | |
| 8,625,603 B1 | 1/2014 | Ramakrishnan et al. | |
| 9,432,204 B2 | 8/2016 | Shen et al. | |
| 9,602,385 B2 | 3/2017 | Tessmer et al. | |
| 9,602,392 B2 | 3/2017 | Tessmer et al. | |
| 9,794,079 B2 | 10/2017 | Tessmer et al. | |
| 9,887,851 B2 | 2/2018 | Shen et al. | |
| 10,103,980 B1 | 10/2018 | Tiwari | |
| 10,218,526 B2 | 2/2019 | Shen et al. | |
| 10,333,727 B2 | 6/2019 | Tessmer et al. | |
| 10,623,194 B2 | 4/2020 | Shen et al. | |
| 10,778,457 B1 | 9/2020 | Mathew et al. | |
| 10,789,267 B1 | 9/2020 | Dhoolam et al. | |
| 10,999,087 B2 | 5/2021 | Tessmer | |
| 11,469,983 B1 * | 10/2022 | Malov | H04L 41/142 |
| 2002/0091926 A1 * | 7/2002 | Fukutomi | H04L 63/104 713/170 |
| 2002/0138618 A1 | 9/2002 | Szabo | |
| 2004/0267897 A1 | 12/2004 | Hill et al. | |
| 2005/0111474 A1 | 5/2005 | Kobayashi | |
| 2005/0147095 A1 | 7/2005 | Guerrero et al. | |
| 2006/0045092 A1 | 3/2006 | Kubsch et al. | |
| 2006/0182033 A1 | 8/2006 | Chen et al. | |
| 2006/0187950 A1 | 8/2006 | Bou-Diab et al. | |
| 2006/0239290 A1 | 10/2006 | Lin et al. | |
| 2007/0058638 A1 | 3/2007 | Guichard et al. | |
| 2007/0253409 A1 | 11/2007 | Fu et al. | |
| 2008/0002727 A1 | 1/2008 | Yamane | |
| 2008/0020758 A1 | 1/2008 | Nagarajan et al. | |
| 2008/0059556 A1 | 3/2008 | Greenspan et al. | |
| 2008/0071900 A1 | 3/2008 | Hecker et al. | |
| 2008/0104273 A1 | 5/2008 | Bruck et al. | |
| 2008/0175239 A1 | 7/2008 | Sistanizadeh et al. | |
| 2008/0186962 A1 | 8/2008 | Sinha | |
| 2008/0205302 A1 | 8/2008 | Florit et al. | |
| 2008/0212496 A1 | 9/2008 | Zou | |
| 2009/0285206 A1 | 11/2009 | Kawauchi et al. | |
| 2010/0002698 A1 | 1/2010 | Clack et al. | |
| 2010/0106779 A1 | 4/2010 | Yamauchi | |
| 2010/0157888 A1 | 6/2010 | Aggarwal et al. | |
| 2010/0157889 A1 | 6/2010 | Aggarwal et al. | |
| 2010/0271948 A1 | 10/2010 | Challapali et al. | |
| 2010/0284402 A1 | 11/2010 | Narayanan | |
| 2011/0022652 A1 | 1/2011 | Lai et al. | |
| 2011/0075664 A1 | 3/2011 | Lambeth et al. | |
| 2011/0188500 A1 * | 8/2011 | Du | H04L 49/201 370/390 |
| 2011/0202920 A1 | 8/2011 | Takase | |
| 2011/0280572 A1 | 11/2011 | Vobbilisetty et al. | |
| 2011/0317696 A1 | 12/2011 | Aldrin et al. | |
| 2012/0106950 A1 | 5/2012 | Madrahalli et al. | |
| 2012/0155322 A1 | 6/2012 | Lamba et al. | |
| 2012/0177042 A1 | 7/2012 | Berman | |
| 2012/0185553 A1 | 7/2012 | Nelson | |
| 2012/0233326 A1 | 9/2012 | Shaffer et al. | |
| 2012/0236734 A1 | 9/2012 | Sampath et al. | |
| 2012/0254943 A1 | 10/2012 | Li | |
| 2012/0278804 A1 | 11/2012 | Narayanasamy et al. | |
| 2012/0307826 A1 | 12/2012 | Matsuoka | |
| 2013/0040677 A1 | 2/2013 | Lee et al. | |
| 2013/0114597 A1 | 5/2013 | Ogisawa et al. | |
| 2013/0124750 A1 | 5/2013 | Anumala et al. | |
| 2013/0159826 A1 | 6/2013 | Mason et al. | |
| 2013/0223454 A1 * | 8/2013 | Dunbar | H04L 45/66 370/400 |
| 2013/0266015 A1 | 10/2013 | Qu et al. | |
| 2013/0318219 A1 | 11/2013 | Kancherla | |
| 2013/0322443 A1 * | 12/2013 | Dunbar | H04L 12/185 370/390 |
| 2014/0052877 A1 | 2/2014 | Mao | |
| 2014/0092907 A1 | 4/2014 | Sridhar et al. | |
| 2014/0098814 A1 | 4/2014 | Bansal et al. | |
| 2014/0169366 A1 | 6/2014 | Kotalwar et al. | |
| 2014/0192804 A1 | 7/2014 | Ghanwani et al. | |
| 2014/0195666 A1 | 7/2014 | Dumitriu et al. | |
| 2014/0243035 A1 | 8/2014 | Jung et al. | |
| 2014/0372624 A1 | 12/2014 | Wang et al. | |
| 2015/0016300 A1 | 1/2015 | Devireddy et al. | |
| 2015/0055651 A1 | 2/2015 | Shen et al. | |
| 2015/0131655 A1 | 5/2015 | Dayama et al. | |
| 2015/0163100 A1 | 6/2015 | Graf et al. | |
| 2015/0172132 A1 | 6/2015 | Tessmer et al. | |
| 2015/0172165 A1 | 6/2015 | Tessmer et al. | |
| 2015/0254190 A1 | 9/2015 | Yang et al. | |
| 2015/0263862 A1 | 9/2015 | Sugyou et al. | |
| 2015/0280928 A1 | 10/2015 | Tessmer et al. | |
| 2015/0381484 A1 | 12/2015 | Hira et al. | |
| 2016/0119156 A1 | 4/2016 | Drake et al. | |
| 2016/0285932 A1 * | 9/2016 | Thyamagundalu | H04L 12/6418 |
| 2016/0301724 A1 | 10/2016 | Kodaypak | |
| 2016/0352531 A1 | 12/2016 | Shen et al. | |
| 2017/0171061 A1 | 6/2017 | Tessmer et al. | |
| 2018/0048478 A1 | 2/2018 | Tessmer et al. | |
| 2018/0062914 A1 * | 3/2018 | Boutros | H04L 45/22 |
| 2018/0159696 A1 | 6/2018 | Shen et al. | |
| 2018/0212788 A1 | 7/2018 | Iszlai et al. | |
| 2019/0190734 A1 | 6/2019 | Shen et al. | |
| 2019/0207779 A1 * | 7/2019 | Immidi | H04L 45/48 |
| 2019/0273625 A1 | 9/2019 | Tessmer et al. | |
| 2020/0403819 A1 | 12/2020 | Mathew et al. | |
| 2021/0044445 A1 * | 2/2021 | Bottorff | H04L 12/1886 |
| 2021/0092092 A1 * | 3/2021 | Lo | H04L 61/2007 |
| 2021/0258178 A1 | 8/2021 | Tessmer et al. | |

FOREIGN PATENT DOCUMENTS

| | | |
|---|---|---|
| CN | 101282338 B | 8/2011 |
| EP | 1855420 A1 | 11/2007 |
| GB | 2458154 A | 9/2009 |
| JP | 2001230774 A | 8/2001 |
| JP | 2005184234 A | 7/2005 |

(56) References Cited

FOREIGN PATENT DOCUMENTS

| | | | |
|---|---|---|---|
| JP | 2006121517 | A | 5/2006 |
| JP | 2006229967 | A | 8/2006 |
| JP | 2009272803 | A | 11/2009 |
| JP | 2010103757 | A | 5/2010 |
| JP | 2011171874 | A | 9/2011 |
| JP | 2015531212 | A | 10/2015 |
| WO | 2004082221 | A2 | 9/2004 |
| WO | 2006095391 | A1 | 9/2006 |
| WO | 2013009850 | A1 | 1/2013 |
| WO | 2013078979 | A1 | 6/2013 |
| WO | 2014087591 | A1 | 6/2014 |
| WO | 2015152976 | A1 | 10/2015 |

OTHER PUBLICATIONS

Casado, Martin, et al., "Sane: A Protection Architecture for Enterprise Networks," Proceedings of the 15th USENIX Security Symposium, Jul. 31-Aug. 4, 2006, 15 pages, USENIX, Vancouver, Canada.
Dumitriu, Dan Mihai, et al., U.S. Appl. No. 61/514,990, filed Aug. 4, 2011, 31 pages.
Gross, J., et al., "Geneve: Generic Network Virtualization Encapsulation," Feb. 14, 2014, 24 pages, Internet Engineering Task Force (IETF).
Narten, Thomas, et al., "Address Resolution Problems in Large Data Center Networks," Jan. 2013, 17 pages, Internet Engineering Task Force (IETF).

\* cited by examiner

SCALABLE OVERLAY MULTICAST ROUTING IN MULTI-TIER EDGE GATEWAYS

BACKGROUND

Multicast is group communication in computer networking where data transmission is addressed to a group of destination computers simultaneously. Multicast can be one-to-many or many-to-many distribution. Group communication makes it possible for the source to efficiently send to the group in a single transmission. Copies are automatically created in network elements such as routers, switches, and cellular network base stations, but only to network segments that currently contain members of the group. Multicast protocols such as Internet Group Management Protocol (IGMP) and Protocol Independent Multicast (PIM) are used to setup the forwarding state in routers based on the information exchanged about the senders and the receivers of multicast traffic.

SUMMARY

Some embodiments of the invention provide a method for offloading multicast replication from multiple tiers of edge nodes implemented by multiple host machines to a physical switch. Each of the multiple host machines implements a provider edge node and a tenant edge node. One host machine among the multiple host machines receives a packet having an overlay multicast group identifier. The host machine maps the overlay multicast group identifier to an underlay multicast group identifier. The host machine encapsulates the packet with an encapsulation header that includes the underlay multicast group identifier to create an encapsulated packet. The host machine forwards the encapsulated packet to a physical switch of the network segment. The physical switch forwards copies of the encapsulated packet to tenant edge nodes at one or more ports that are determined to be interested in the underlay multicast group identifier.

The packet may be received from a tenant network and the host machine hosts a tenant edge node that serves data traffic to and from the tenant network. Each tenant edge node is serving data traffic, including multicast traffic to and from a tenant network by performing gateway functions. The packet may also be received from an external network, and the particular provider edge node serves data traffic, including multicast traffic, to and from the external network by performing gateway functions. The particular provider edge node is actively serving data traffic to and from the external network, and other provider edge nodes implemented by other host machines are standing by and not actively serving data traffic to and from the external network.

In some embodiments, a network controller (e.g., SDN controller) sends multicast grouping information associating an overlay multicast group identifier with (i) a corresponding underlay multicast group identifier and (ii) a list of VTEPs that are interested in the multicast group to each tenant edge and each provider edge. In some embodiments, the network controller generates the multicast grouping information based on the multicast reports (e.g., IGMP inquiry reports) that associates VTEPs with overlay multicast group identifiers. In some embodiments, the list of VTEPs that are interested in a multicast group sent to a particular tenant edge node distinguishes (i) VTEPs connected to a same network segment as the particular tenant edge node from (ii) VTEPs connected to a different network segment as the particular tenant edge node.

A tenant edge node receiving a copy of the encapsulated packet may decapsulate the packet to remove the underlay multicast group identifier and forward the decapsulated packet to a tenant network by multicast based on the overlay multicast group identifier. The particular provider edge node may also receive a copy of the encapsulated packet from the physical switch and forward a decapsulated copy of the packet to the external network without the underlay multicast group identifier. In some embodiments, when the packet is received from the external network, the host machine that implements the particular provider edge node receives the packet, maps the overlay multicast group identifier to the underlay multicast group identifier, encapsulates the packet with an encapsulation header that includes the underlay multicast group identifier, and forwards the encapsulated packet to the physical switch of the first network segment.

In some embodiments, the host machine may use the multicast grouping information sent to the host machine to identify any VTEPs in other segments that are also interested in the multicast group. If there is a VTEP in another network segment interested in the multicast group, the host machine identifies a VTEP at a second network segment having a tenant edge node that is interested in the underlay multicast group identifier. The host machine forwards the packet to the identified VTEP by unicast.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In a software defined network (SDN) environment, a provider level (Tier-0 or T0) edge logical router device acts as the gateway between physical network (e.g., wide area network or WAN) and virtual or overlay networks. In a multi-tenant topology, a tenant level (Tier-1 or T1) dedicated edge device can be configured to be the gateway for a given tenant. For traffic originated in an overlay network, a T1 edge routes data packets to a T0 edge to connect to the physical network. Similarly, WAN traffic from the physical network reaches T0 edge gateway and then gets routed to T1 edge gateways. An edge transport node (TN) can host one or more T0 and/or T1 routers and there can be multiple such edge TNs in a cluster. (An edge can be referred to as an edge node, an edge router, an edge device, an edge gateway, an edge TN, etc.)

Figure 1A:
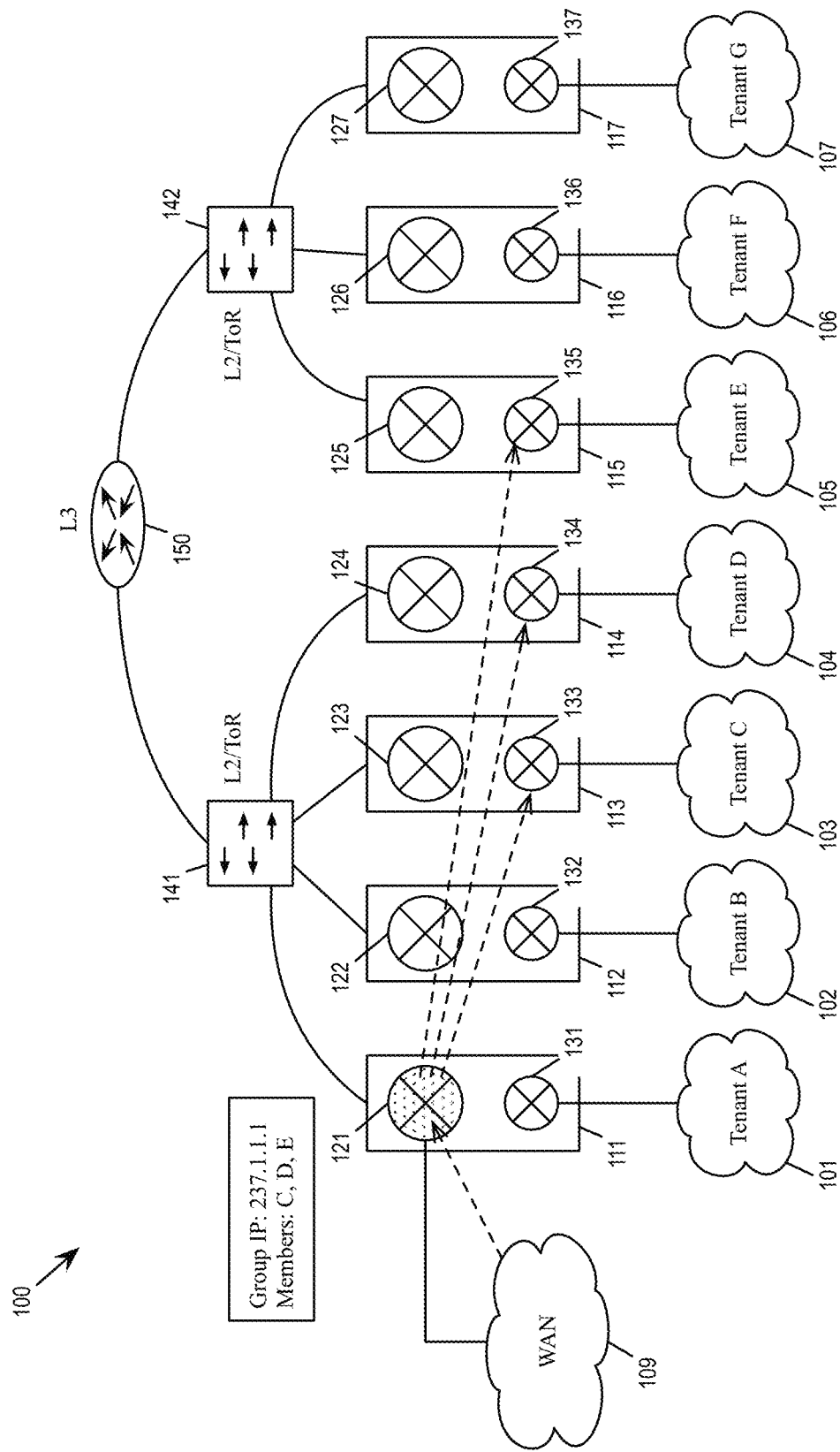
FIGS. 1A-B illustrate a software defined network (SDN) environment in which a first tier of edge routers performs gateway functions for traffic to and from a physical network and a second tier of edge routers performs gateway functions for traffic to and from tenant networks.
Figure 1B:
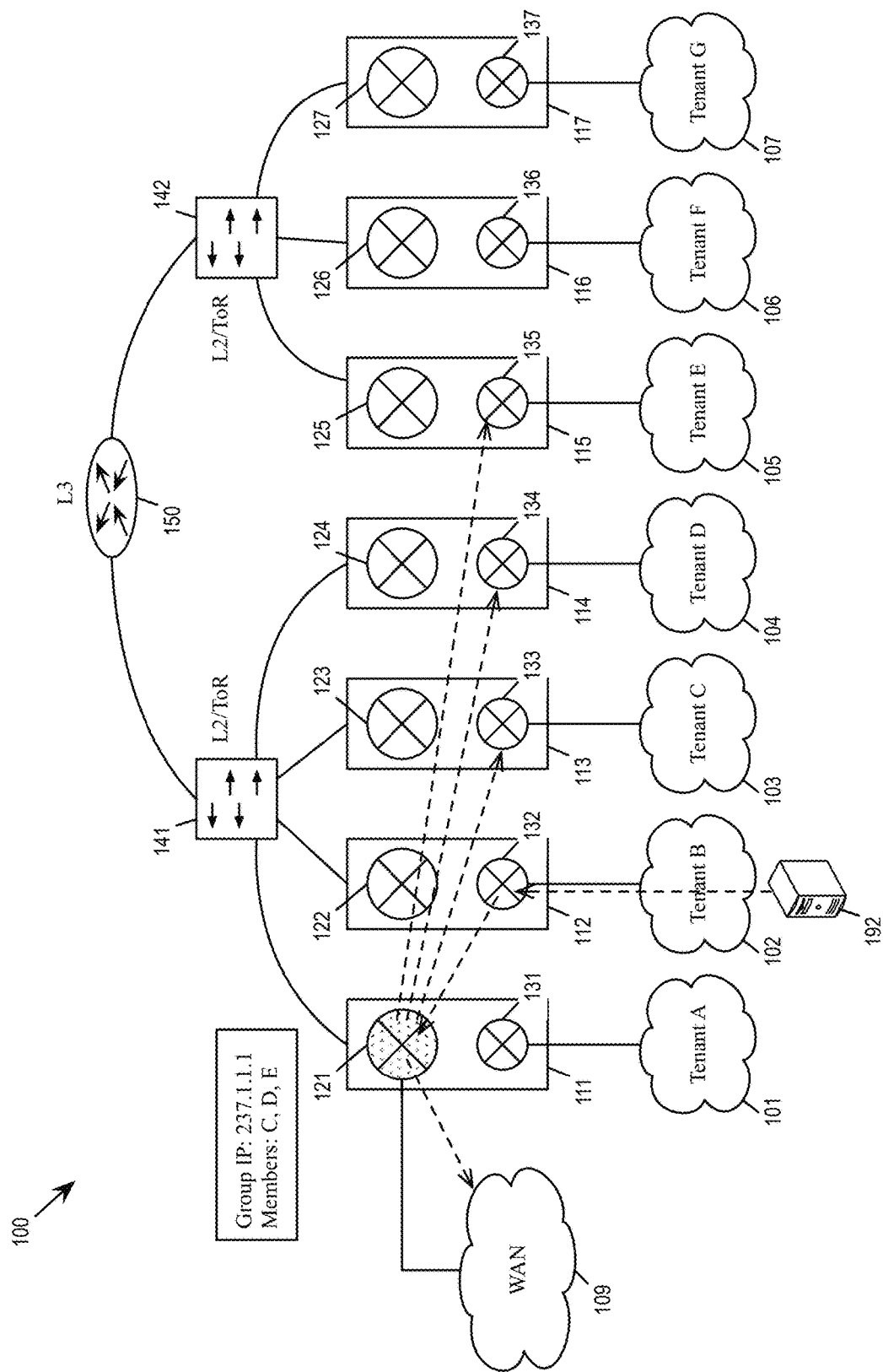

FIGS. 1A-B illustrate a software defined network (SDN) environment in which a first tier of edge routers performs gateway functions for traffic to and from a physical network and a second tier of edge routers performs gateway functions for traffic to and from tenant networks.

As illustrated, a SDN environment is a network 100 that provide connectivity to several tenant networks 101-107 (tenants A through G). The network 100 also provide connectivity to an external physical network that is a wide area network (WAN) 109. The network 100 may include physical network components provided by one or more datacenters as underlay.

The network 100 includes a cluster of host machines 111-117 that implement a first tier of edge routers 121-127 and a second tier of edge routers 131-137. The first tier of edge routers 121-127 are provider edge routers (also referred to as T0 edges) shared by different tenants of a datacenter. The first tier provider edge routers also perform gateway function for traffic to and from a WAN 109 in active/standby mode. The second tier of routers 131-137 are tenant edge routers (or T1 edges or T1 TNs) for tenant networks 101-107, each T1 edge performing gateway function for traffic to and from a tenant network. The T0 provider edges and the T1 tenant edges together enable traffic between the WAN 109 and the tenant networks 101-107 (North-South traffic), as well as traffic among the different tenant networks (East-West traffic).

Each host machine is addressable by a virtual tunnel endpoint (VTEP) address, as traffic to and from the different host machines are conducted by tunnels. In the example, the host machines 111-114 are interconnected by a physical L2 switch 141 (Top of Rack or ToR switch), while the host machines 115-117 are interconnected by a different L2 switch 142. In other words, in the physical underlay, the host machines 111-114 belong to one network segment and the host machines 115-117 belongs to a different network segment.

When edge devices are configured as multicast-routers, IP-multicast traffic will be routed from the physical network (e.g., the WAN 109) to the virtual network (e.g., tenant networks 101-107) and vice-versa. While edges are running in a multi-tiered architecture, inter-tier multicast traffic is routed by one centralized T0 router. This is because only one router is allowed to be the multicast querier for each network segment (L2 segment or IP subnet) according to multicast protocols such as Protocol-Independent Multicast (PIM) or Internet Group Management Protocol (IGMP). Thus, one edge gateway (e.g., T0 edge 121) that supports IP multicast routing encapsulates and replicates the routed multicast packets to all edge virtual tunnel endpoints (VTEPs) that have receivers for the corresponding multicast group in an overlay domain and another copy towards PIM core for receivers in the physical network (e.g., WAN 109).

In the example of FIGS. 1A-B, the T0 edge node 121 is the centralized T0 (provider) router for multicast, and it is also the active edge in active/standby configuration for handling multicast traffic to and from the WAN 109. Specifically, the provider edge node 121 is actively serving data traffic to and from the external network WAN 109 and other provider edge nodes 122-127 implemented by other host machines 112-117 are standing by and not actively serving data traffic to and from the WAN 109. The T0 edge node 121 is therefore also referred to as the active T0 edge.

The active T0 edge node 121 receives multicast traffic for a multicast group having an identifier of 237.1.1.1, and by multicast inquiry the T0 edge 121 knows that tenant networks C, D, E have receivers that are interested in the multicast group 237.1.1.1. FIG. 1A illustrates the active T0 edge node 121 receiving N-S multicast traffic from the WAN 109 and replicating the traffic to T1 TNs 133, 134, and 135 (corresponding to tenant networks C, D, and E.) FIG. 1B illustrates the active T0 edge node 121 receiving E-W multicast traffic from T1 TN 132 (originates from a source 192 in tenant network B) and replicating the traffic to T1 TNs 133, 134, and 135 (corresponding to tenant networks C, D, and E) as well as the WAN 109.

Having the one T0 edge 121 to centrally replicate multicast traffic for multiple different T1 TNs degrades the multicast routing throughput and latency, because the throughput of multicast traffic flow is limited by total number of replications that the one centralized T0 edge performs. The more T1 edge TNs there are to receive multicast traffic, the more replications that the one centralized T0 edge 121 has to perform, and more likely to saturate the downlink bandwidth of the centralized T0 edge. Relying on the one T0 edge 121 to handle traffic for all T1 TNs also makes the multicast replication scheme difficult to scale for additional tenant networks. For example, if 2 Gbps of multicast source traffic are to be replicated to 5 different T1 edges, then the 10 G uplinks of the T0 edge will be saturated by this one multicast flow and traffic from other sources cannot be processed. In that instance, the one centralized T0 edge can only accommodate up to 5 T1 edge TNs at one time.

Some embodiments of the invention provide a method for scaling the multicast replications to a larger number of T1 edge TNs using Top-of-Rack (ToR) L2-multicast, without reducing routing throughput or worsening forwarding latency. Specifically, the number of multicast replications at the active centralized T0 edge (e.g., 121) is reduced by offloading multicast replication to L2 ToR switches (e.g., ToRs 141 and 142) using underlay multicast group IPs. Routing throughput is further improved by leveraging underlay multicast replication using underlay multicast group IPs and VTEP list that are synchronized by a SDN controller. Doing so allows larger number of parallel flows which results in higher throughput and enables larger number of tenants to participate in multicast routing. Reducing number of replications at source edge TNs also improves or reduces routing latency. In some embodiments, multicast routing protocols are not used at T1 edges, which keeps T1 edges to be light-weight forwarding planes. Multicast routing throughput can be scaled out (horizontal scaling) by deploying more TNs with T1 edges.

Figure 2A:
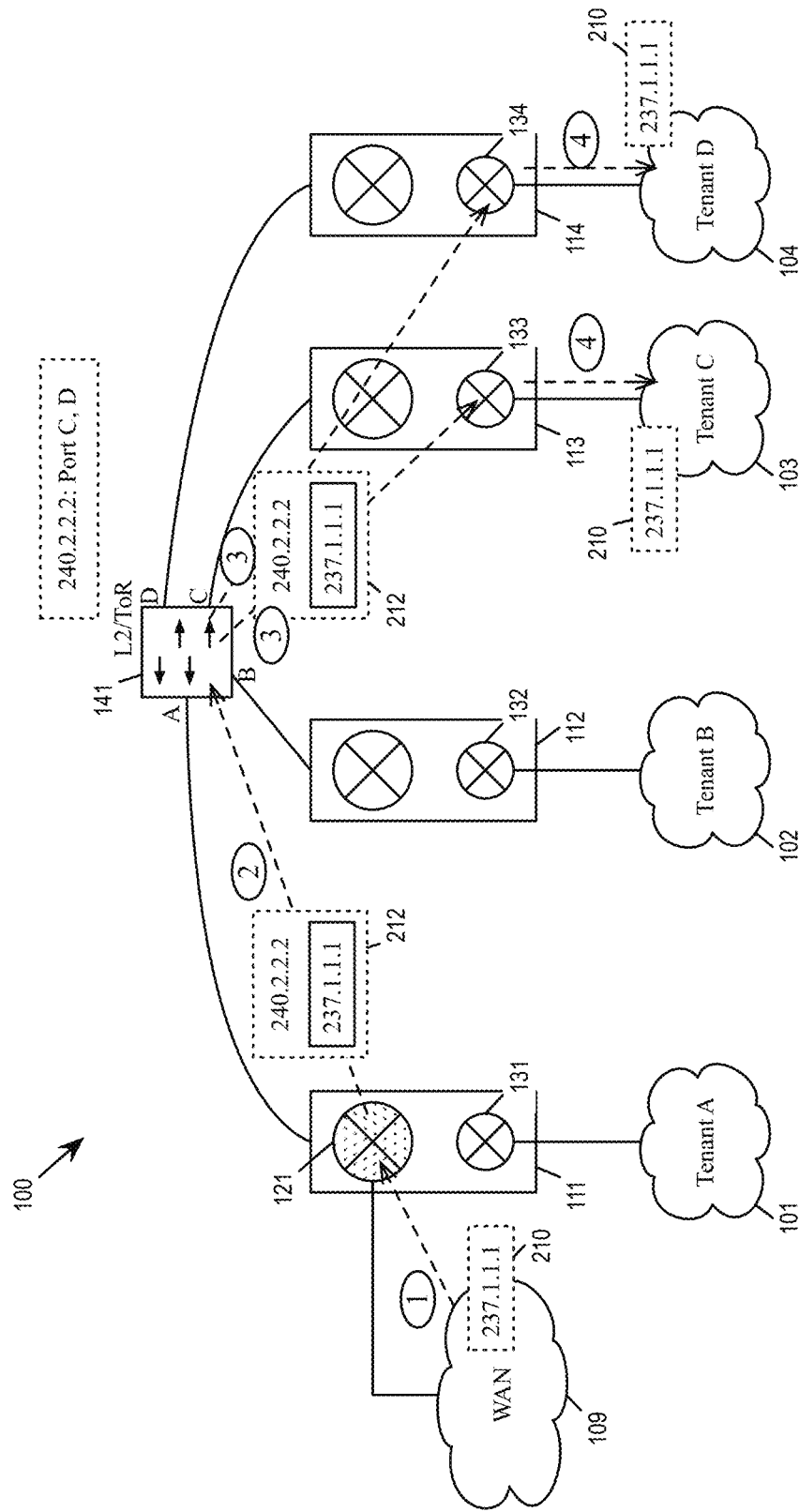
FIGS. 2A-B conceptually illustrate using underlay group IP to offload multicast replication to a physical switch.
Figure 2B:
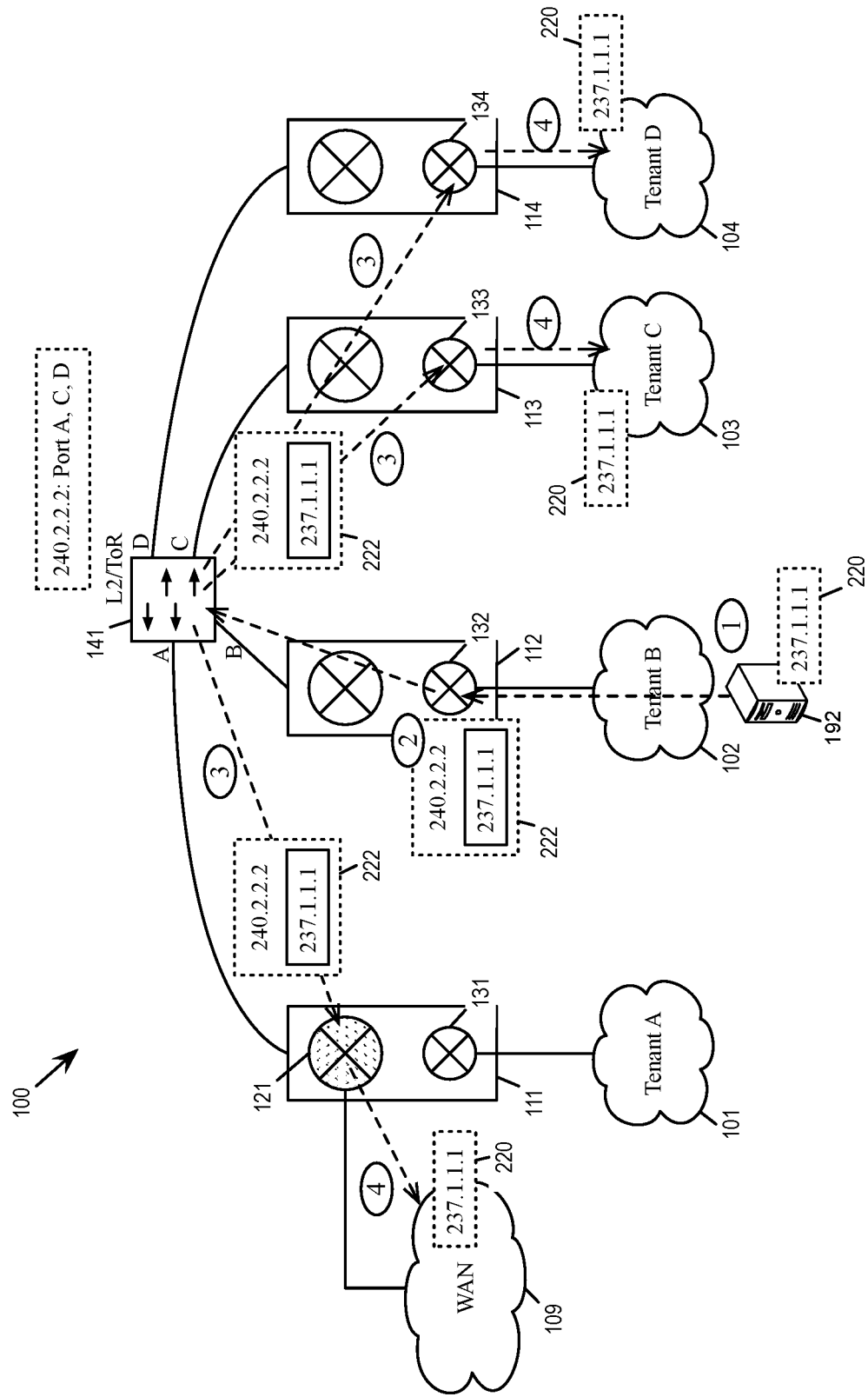

FIGS. 2A-B conceptually illustrate using underlay group IP to offload multicast replication to a ToR switch. FIG. 2A illustrates offloading multicast replication for N-S traffic that originates in the WAN 109. The figure illustrates operations that are labeled (1) through (4). At operations labeled (1), the host machine 111 (in the cluster of host machines 111-117) receives a packet 210 having the overlay multicast group identifier 237.1.1.1 from the WAN 109. Since this is traffic from an external network, the traffic is processed by the active T0 edge 121 implemented by the host machine 111.

At operations labeled (2), the host machine 111 maps the overlay multicast group identifier 237.1.1.1 to an underlay multicast group identifier 240.2.2.2. The host machine 111 encapsulates the packet 210 with an encapsulation header that includes the underlay multicast group identifier 240.2.2.2 to create an encapsulated packet 212. The host machine 111 forwards the encapsulated packet to the physical switch (L2-ToR) 141 (which is the L2 switch of the network segment that includes host machines 111-114).

At operations labeled (3), the physical switch 141 forwards copies of the encapsulated packet 212 to host machines 113 and 114 (having tenant edge nodes 133 and 134) at one or more ports of the switch that are determined (by IGMP snooping) to be interested in (or has receivers for) the underlay multicast group identifier 240.2.2.2. (The multicast traffic is replicated to ports that correspond to tenant C and tenant D).

At operations labeled (4), the T1 tenant edge node 133 decapsulates the packet 212 into the packet 210 and forwards the decapsulated packet 210 to tenant network 103 (for tenant C). Likewise, the T1 tenant edge node 134 decapsulates the packet 212 into the packet 210 and forwards the decapsulated packet 210 to tenant network 104 (for tenant D).

FIG. 2B illustrates offloading multicast replication for E-W traffic that originates in one of the tenant networks. The figure illustrates operations that are labeled (1) through (4). At operations labeled (1), the host machine 112 receives a packet 220 having the overlay multicast group identifier 237.1.1.1 from the tenant network 102 (tenant B).

At operations labeled (2), the host machine 112 maps the overlay multicast group identifier 237.1.1.1 to the underlay multicast group identifier 240.2.2.2. The host machine 112 encapsulates the packet 220 with an encapsulation header that includes the underlay multicast group identifier 240.2.2.2 to create an encapsulated packet 222. The host machine 112 forwards the encapsulated packet 222 to the physical switch (L2-ToR) 141.

At operations labeled (3), the physical switch 141 forwards copies of the encapsulated packet 222 to host machines 113 and 114 (having tenant edge nodes 133 and 134) at one or more ports of the switch that are determined (by IGMP snooping) to be interested in (or has receivers for) the underlay multicast group identifier 240.2.2.2. (The multicast traffic is replicated to ports that corresponds to tenant C and tenant D). The physical switch 141 also forwards a copy of the encapsulated packet 222 to the host machine 111 having the active T0 edge 121 to be forwarded to the WAN 109.

At operations labeled (4), the T1 tenant edge node 133 decapsulates the packet 222 into the packet 220 (to remove the underlay multicast group identifier) and forwards the decapsulated packet 220 to tenant network 103 (for tenant C). Likewise, the T1 tenant edge node 134 decapsulates the packet 222 into the packet 220 and then forwards the decapsulated packet 220 to tenant network 104 (for tenant D). Also, the T0 active edge 121 decapsulates the packet 222 and forwards the decapsulated packet 220 to the WAN 109.

In some embodiments, a controller of the SDN network (or SDN controller) associates or maps each overlay multicast group identifier with a corresponding underlay multicast group identifier. The underlay multicast group identifier is one that is predetermined to be available in the underlay domain. In the example of FIGS. 1 and 2, the SDN controller maps the overlay multicast group identifier 237.1.1.1 to the underlay multicast group identifier 240.2.2.2.

The SDN controller also sends multicast group information to each T1 (tenant) edge and each T0 (provider) edge. The multicast group information may include mapping for associating each overlay multicast group identifier with its corresponding underlay multicast group identifier. For each multicast group, the multicast group information may also include a list of VTEPs that are interested in the multicast group. In some embodiments, the list of VTEPs interested in the multicast group is identified based on multicast reports (e.g., IGMP reports) associating VTEPs with overlay multicast group identifiers.

In some embodiments, the list of VTEPs in the multicast information sent to a particular tenant edge node distinguishes (i) VTEPs connected to a same network segment as the particular tenant edge node from (ii) VTEPs connected to a different network segment as the particular tenant edge node. Based on the multicast group information, the T1 tenant edge may send the packet to receivers in the same segment by encapsulating the underlay multigroup identifier (to rely on the ToR switch to perform multicast replication); or directly send the packet to receivers in a different segment without encapsulating the underlay multigroup identifier.

Figure 3:
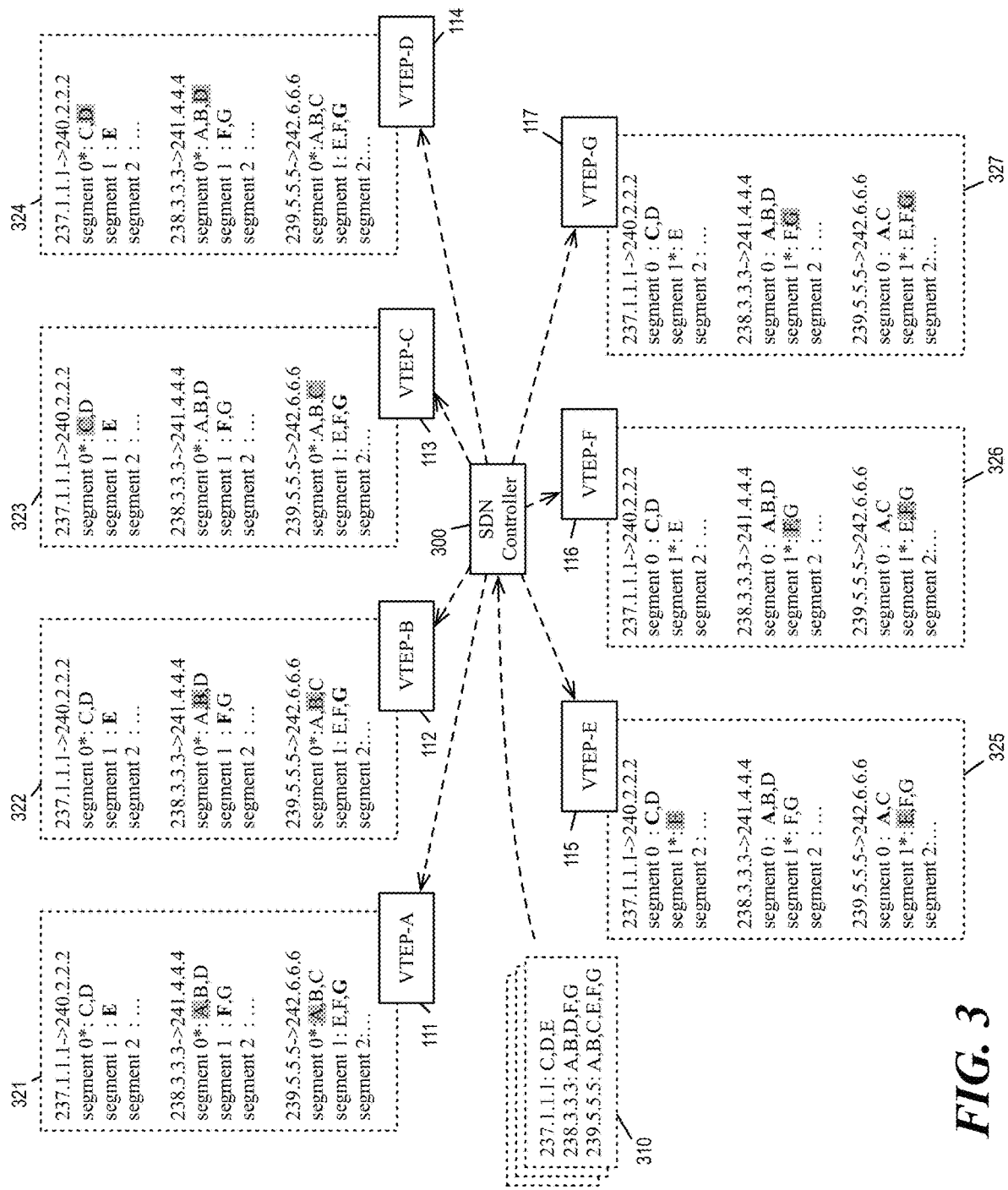
FIG. 3 conceptually illustrates multicast group information that are sent by a SDN controller to each host machine implementing tenant edges and provider edges.

FIG. 3 conceptually illustrates multicast group information that are sent by a SDN controller to each host machine implementing tenant edges and provider edges. A controller 300 of the network 100 receives multicast (e.g., IGMP) reports 310 associating VTEPs with overlay multicast group identifiers. As illustrated, the reports 310 include identified VTEPs of host machines that are interested in the each of several multicast groups. For example, for the multicast group 237.1.1.1, the reports 310 identify VTEPs C, D, and E (of host machines 113, 114, 115) as having interested receivers; for the multicast group 238.3.3.3, the reports 310 identify VTEPs A, B, D, F, G (of host machines 111, 112, 114, 116, 117) as having interested receivers, etc.

The controller 300 then maps each overlay multicast group identifier to underlay multicast group identifier. Thus, the overlay multicast group identifier or address 237.1.1.1 is mapped to an underlay multicast group identifier 240.2.2.2, the overlay multicast group identifier or address 238.3.3.3 is mapped to an underlay multicast group identifier 241.4.4.4, etc. The underlay multicast group identifiers are chosen from IP address ranges that are available for use in the underlay domain. Based on the received multicast reports and the multicast group identifier mapping, the controller 300 generates and sends multicast group information to VTEPs of host machines that hosts tenant edges and each provider edge. Each host machine and the T0/T1 edges hosted by the host machines in turn uses the multicast group information to map multicast group identifiers and to identify which VTEPs are interested in which multicast group.

In the figure, multicast group information 321-327 are sent to host machines 111-117 (VTEPs A through G), respectively. The multicast group information sent to each host machine associates each overlay multicast group identifier with (i) its corresponding underlay multicast group identifier and (ii) a list of VTEPs that are interested in the multicast group to each tenant edge and each provider edge. Thus, in the multicast group information 321-327, the overlay multicast group identifier 237.1.1.1 is associated with the underlay multicast group identifier 240.2.2.2 and a list that includes VTEPs C, D, and E, and the overlay multicast group identifier 238.3.3.3 is associated with the underlay multicast group identifier 241.4.4.4 and a list that includes VTEPs A, B, D, F, G, etc.

In some embodiments, the multicast information sent to a host machine does not list the VTEP of the host machine as one of the VTEPs interested in any of the multicast groups. As illustrated in the figure, the multicast group information 321 sent to VTEP-A does not list VTEP-A as one of the VTEPs interested in the multicast group 238.3.3.3 (so "A" in information 321 appear darkened), while the multicast group information 322 sent to VTEP-B does not list VTEP-B as one of the VTEPs interested in the multicast group 238.3.3.3 (so "B" in information 322 appear darkened). Thus, multicast traffic from tenant A network will not be replicated by the tenant edge in VTEP A for multicast group 238.3.3.3, even if tenant A has a receiver for the multicast group 238.3.3.3.

In some embodiments, the list of VTEPs of multicast groups sent to a particular host machine or tenant edge node distinguishes VTEPs connected to a same network segment as the particular tenant edge node or host machine from VTEPs connected to a different network segment as the particular tenant edge node or host machine. In the example of FIGS. 1-2, VTEPs A-D (host machines 111-114) are in a same network segment interconnected by ToR switch 141, and VTEPs E-G (host machines 115-117) are in a different network segment interconnected by the ToR switch 142. For example, for the multicast group 238.3.3.3 (241.4.4.4), in the multicast group information 321-324 sent to VTEPs A-D, VTEPs A, B, and D are identified as being in the same network segment (segment 0 with '*' mark) as the receiving T1 TNs in host machines 111-114; VTEPs F and G are identified as being in a different segment. In the multicast information 325-327 sent to VTEPs E-G, VTEPs F and G are identified as being in the same network segment (segment 1 with '*' mark) as the receiving T1 TNs in host machines 115-117; VTEP A, B, and D are identified as being in a different segment.

Figure 4:
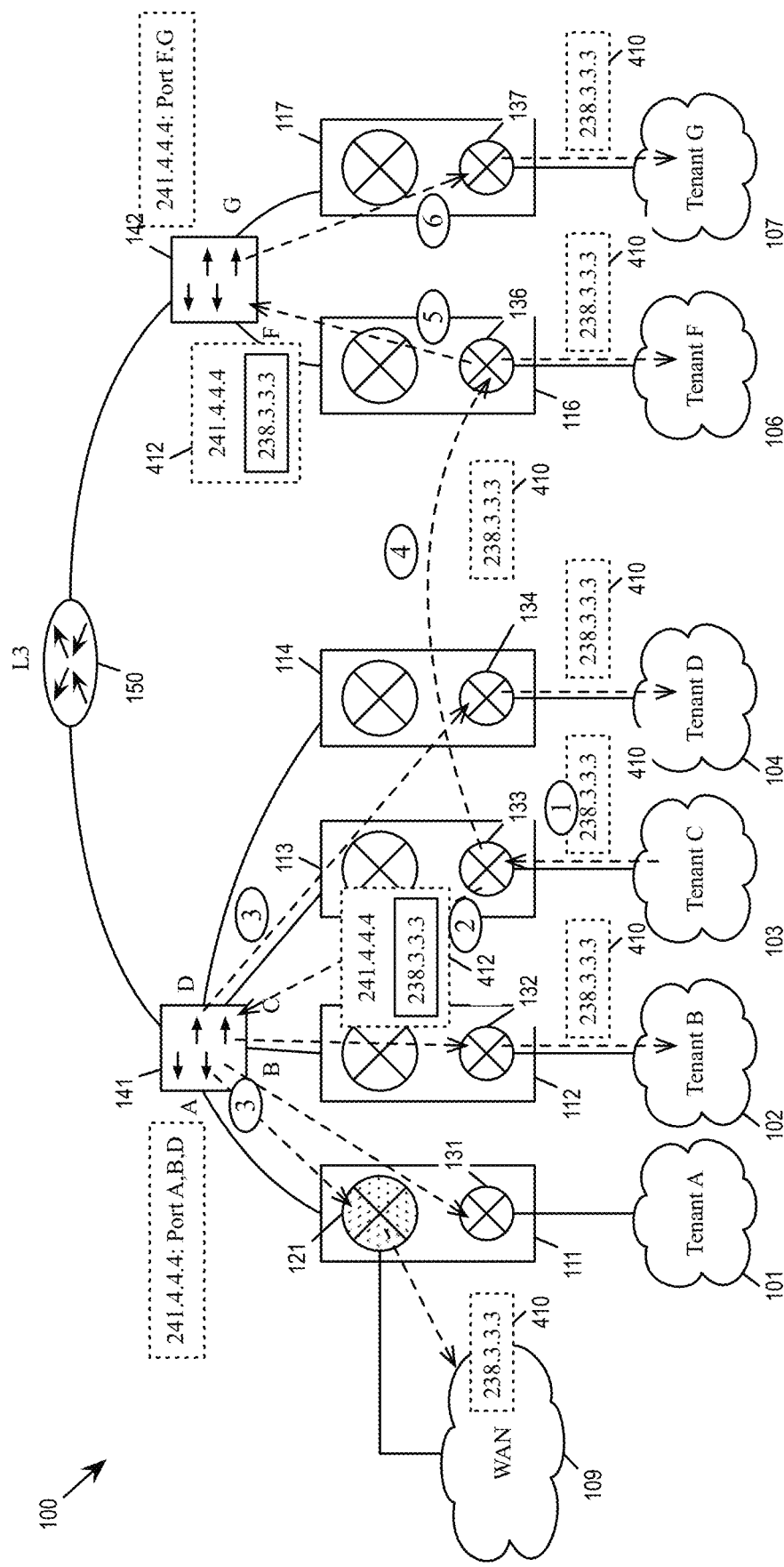
FIG. 4 illustrates multicast replication to a host machine in a different network segment by unicast.

In some embodiments, a T1 (tenant) edge node receiving the multicast group information would identify a VTEP at a different network segment having a tenant edge node that is interested in the underlay multicast group identifier. The T1 edge node then forwards the packet to the identified VTEP by direct unicast rather than by using the ToR switch. FIG. 4 illustrates multicast replication to a host machine in a different network segment by unicast. The example illustrates the replication of a packet belonging to the multicast group 238.3.3.3 across two different network segments in the network 100. The figure illustrates operations that are labeled (1) through (6). At operations labeled (1), the host machine 113 receives a packet 410 having the overlay multicast group identifier 238.3.3.3 from the tenant network 103 (tenant C).

At operations labeled (2), the host machine 113 maps the overlay multicast group identifier 238.3.3.3 to the underlay multicast group identifier 241.4.4.4 (by using the multicast information 323.) The host machine 113 (at the T1 edge 133) encapsulates the packet 410 with an encapsulation header that includes the underlay multicast group identifier 241.4.4.4 to create an encapsulated packet 412. The host machine 113 forwards the encapsulated packet 412 to the physical switch (L2-ToR) 141.

At operations labeled (3), the physical switch 141 forwards copies of the encapsulated packet 412 to host machines 111, 112 and 114 (having T1 edges 131, 132, 134) at one or more ports of the switch 141 that are determined to be interested in the underlay multicast group identifier 241.4.4.4. (The multicast traffic is replicated to ports that corresponds to VTEPs A, B and D). The physical switch 141 also forwards a copy of the encapsulated packet 412 to the host machine 111 having the active T0 edge 121 to be forwarded to the WAN 109. The T1 tenant edge nodes 131, 132, 134, and the active T0 edge in turn decapsulate the packets to remove the underlay multicast group identifier and forwards the decapsulated packet to their respective tenant networks (including the WAN 109).

(In some embodiments, the physical switch 141 learns which ports or which VTEPs are interested in the underlay multicast group 241.4.4.4 by IGMP snooping. Specifically, the VTEPs may initiate IGMP join on the underlay multicast group 241.4.4.4 toward the physical switch 141, when a TN has an overlay receiver learned from its attached tenant network and the SDN controller 300 sends the underlay multicast mapping for the corresponding overlay multicast group. The physical switch 141 learns VTEP port based on the IGMP report message on the VLANs (aka Transport VLAN) that the VTEPs belong to. If there is any TN that does not have any tenant that is interested in 241.4.4.4 then TOR will not forward the packets to that particular TN.)

At operations labeled (4), the T1 edge 133 (at VTEP C) forwards a copy of the multicast packet 410 to the T1 edge 136 (at VTEP F) by unicast. The T1 edge 133 performs this operation because the multicast group information 323 sent to host machine 113 indicates that VTEPs F and G are also interested in the multicast group 238.3.3.3 (241.4.4.4), and that VTEPs F and G are in a different network segment than VTEP C. The host machine 113 therefore sends the packet 410 to the T1 edge 136. In some embodiments, the packet 410 is sent using an overlay tunnel from the VTEP-C to VTEP-F, though physically through the L2 switches 141 and 142 and L3 router 150.

At operations labeled (5), the T1 edge 136 (at VTEP-F or the host machine 116) maps the overlay multicast group identifier 238.3.3.3 to the underlay multicast group identifier 241.4.4.4 (by using the multicast information 326.) The host machine 116 (at the T1 edge 136) encapsulates the packet 410 with an encapsulation header that includes the underlay multicast group identifier 241.4.4.4 to create an encapsulated packet 412. The host machine 113 forwards the encapsulated packet 412 to the physical switch (L2-ToR) 142.

At operations labeled (6), the physical switch 142 forwards copies of the encapsulated packet 412 to the host machine 117 (having T1 edge 137) at ports of the switch that are determined to be interested in the underlay multicast group identifier 241.4.4.4. (The multicast traffic is replicated to ports that correspond to VTEP-G). The T1 tenant edge 137 in turn decapsulates the packet to remove the underlay multicast group identifier and forwards the decapsulated packet 410 to tenant network G 107 with overlay multicast group identifier 238.3.3.3.

Figure 5:
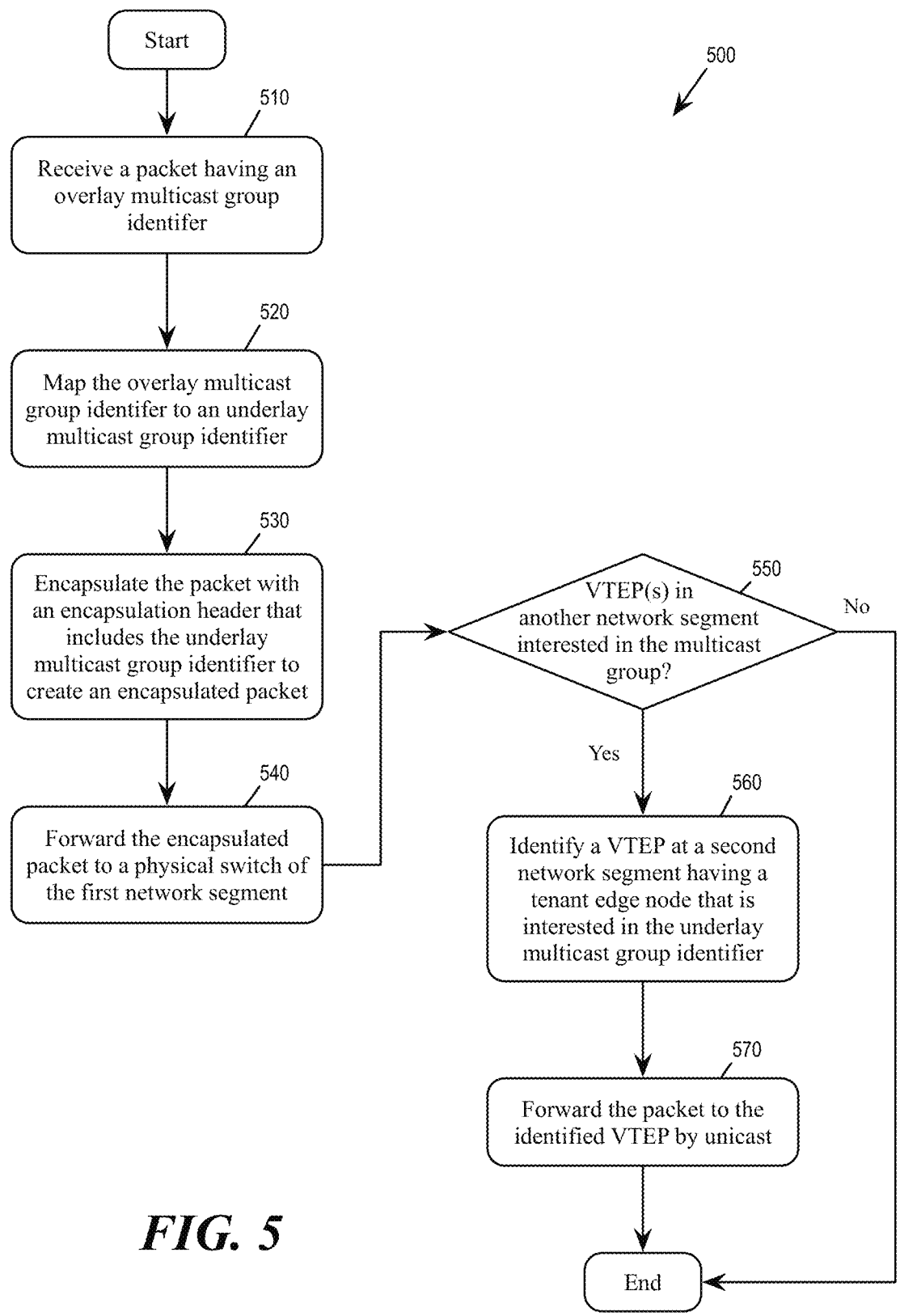
FIG. 5 conceptually illustrates a process for offloading multicast replication from tiered edge routers to physical switches.

For some embodiments, FIG. 5 conceptually illustrates a process 500 for offloading multicast replication from tiered edge routers to ToR physical switches. In some embodiments, one or more processing units (e.g., processor) of a computing device implementing one of the host machines 111-117 performs the process 500 by executing instructions stored in a computer readable medium. Each host machine implements a provider edge node (T0 edge) and a tenant edge node (T1 edge), each host machine addressable by a unique virtual tunnel endpoint (VTEP). A particular provider edge node implemented by one of the host machines is a multicast querier (e.g., under IGMP) of a first network segment.

In some embodiments, the process 500 starts when the host machine receives (at 510) a packet having an overlay multicast group identifier. The packet may be received from a tenant network and the host machine hosts a tenant edge node that serves data traffic to and from the tenant network. Each tenant edge node is serving data traffic, including multicast traffic to and from a tenant network by performing gateway functions. The packet may also be received from an external network (e.g., WAN), and the particular provider edge node serves data traffic, including multicast traffic, to and from the external network by performing gateway functions. The particular provider edge node is actively serving data traffic to and from the external network, and other provider edge nodes implemented by other host machines are standing by and not actively serving data traffic to and from the external network.

The host machine maps (at 520) the overlay multicast group identifier to an underlay multicast group identifier according to mapping information provided by a network controller. In some embodiments, a network controller (e.g., SDN controller) sends multicast grouping information associating an overlay multicast group identifier with (i) a corresponding underlay multicast group identifier and (ii) a list of VTEPs that are interested in the multicast group to each tenant edge and each provider edge. In some embodiments, the network controller generates the multicast grouping information based on the multicast reports (e.g., IGMP inquiry reports) that associates VTEPs with overlay multicast group identifiers. In some embodiments, the list of VTEPs that are interested in a multicast group sent to a particular tenant edge node distinguishes (i) VTEPs connected to a same network segment as the particular tenant edge node from (ii) VTEPs connected to a different network segment as the particular tenant edge node.

The host machine encapsulates (at 530) the packet with an encapsulation header that includes the underlay multicast group identifier to create an encapsulated packet.

The host machine forwards (at 540) the encapsulated packet to a physical switch of the first network segment. The physical switch then forwards copies of the encapsulated packet to tenant edge nodes at one or more ports that are determined (by e.g., IGMP snooping) to be interested in (or has receivers for) the underlay multicast group identifier. A tenant edge node receiving a copy of the encapsulated packet may decapsulate the packet to remove the underlay multicast group identifier and forward the decapsulated packet to a tenant network by multicast based on the overlay multicast group identifier. The particular provider edge node may also receive a copy of the encapsulated packet from the physical switch and forward a decapsulated copy of the packet to the external network without the underlay multicast group identifier. In some embodiments, when the packet is received from the external network, the host machine that implements the particular provider edge node receives the packet, maps the overlay multicast group identifier to the underlay multicast group identifier, encapsulates the packet with an encapsulation header that includes the underlay multicast group identifier, and forwards the encapsulated packet to the physical switch of the first network segment.

The host machine then determines (at 550) whether VTEP(s) in another network segment is interested in the multicast group. The host machine may use the multicast grouping information sent to the host machine to identify any VTEPs in other segments that are also interested in the multicast group. If there is a VTEP in another network segment interested in the multicast group, the process proceeds to 560. If no other network segment has a VTEP that is interested in the multicast group, the process 500 ends.

At 560, the host machine identifies a VTEP at a second network segment having a tenant edge node that is interested in the underlay multicast group identifier. The host machine forwards (at 570) the packet to the identified VTEP by unicast. The process 500 then ends.

Figure 6:
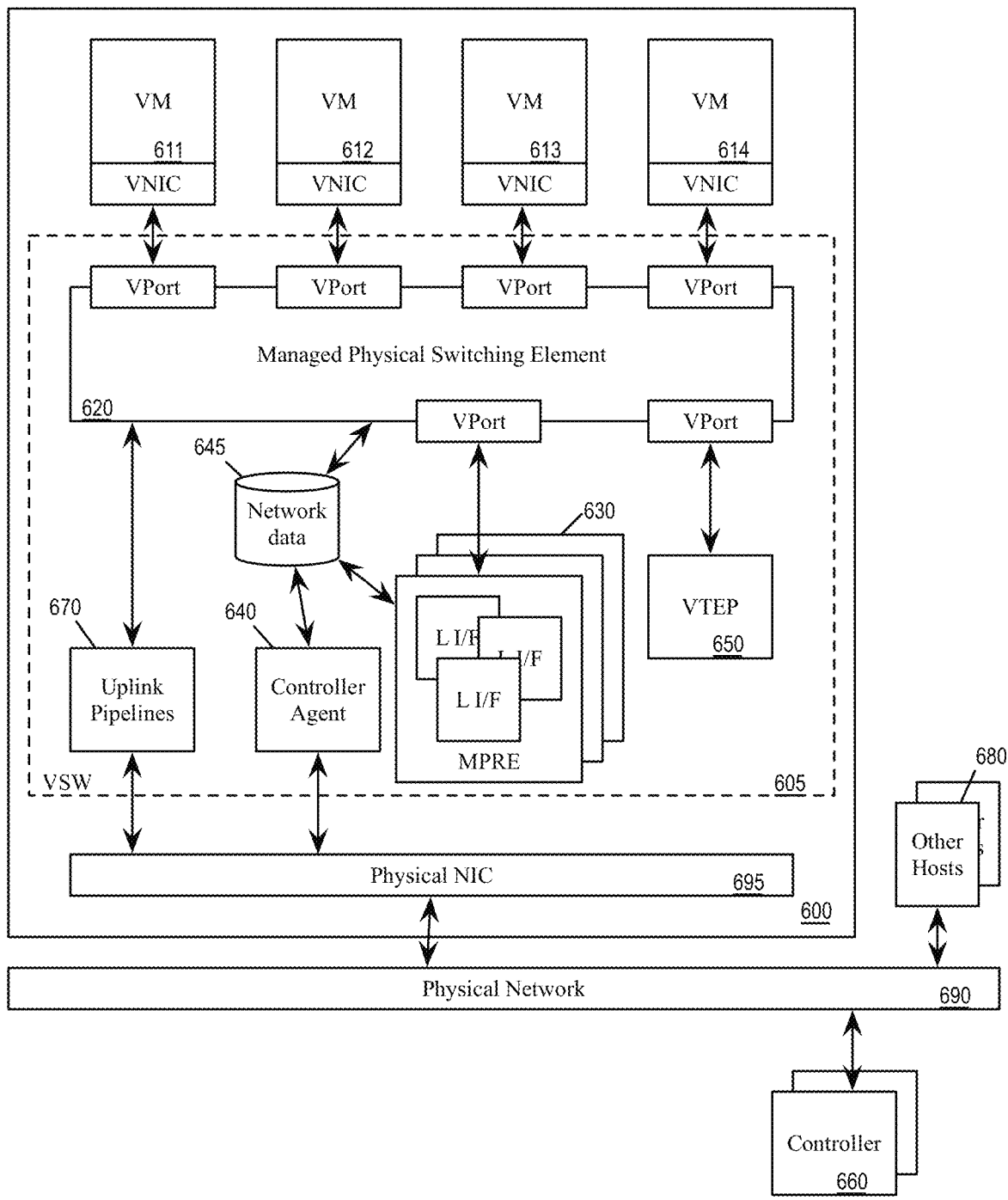
FIG. 6 illustrates a computing device that serves as a host machine that runs virtualization software.

As mentioned, provider edges (T0 edge nodes) and tenant edges (T1 edge nodes) may be implemented by host machines that are running virtualization software, serving as virtual network forwarding engines. Such a virtual network forwarding engine is also known as managed forwarding element (MFE), or hypervisors. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 6 illustrates a computing device 600 that serves as a host machine that runs virtualization software for some embodiments of the invention.

As illustrated, the computing device 600 has access to a physical network 690 through a physical NIC (PNIC) 695. The host machine 600 also runs the virtualization software 605 and hosts VMs 611-614. The virtualization software 605 serves as the interface between the hosted VMs 611-614 and the physical NIC 695 (as well as other physical resources, such as processors and memory). Each of the VMs 611-614 includes a virtual NIC (VNIC) for accessing the network through the virtualization software 605. Each VNIC in a VM 611-614 is responsible for exchanging packets between the VM 611-614 and the virtualization software 605. In some embodiments, the VNICs are software abstractions of physical NICs implemented by virtual NIC emulators.

The virtualization software 605 manages the operations of the VMs 611-614, and includes several components for managing the access of the VMs 611-614 to the physical network 690 (by implementing the logical networks to which the VMs connect, in some embodiments). As illustrated, the virtualization software 605 includes several components, including a MPSE 620, a set of MPREs 630, a controller agent 640, a network data storage 645, a VTEP 650, and a set of uplink pipelines 670.

The VTEP (virtual tunnel endpoint) 650 allows the host machine 600 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM 611-614 on the host machine 600 sends a data packet (e.g., an Ethernet frame) to another VM in the same VXLAN network but on a different host (e.g., other machines 680,) the VTEP 650 will encapsulate the data packet using the VXLAN network's VNI and network addresses of the VTEP 650, before sending the packet to the physical network 690. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 670.

The controller agent 640 receives control plane messages from a controller 660 (e.g., a CCP node) or a cluster of controllers. In some embodiments, these control plane messages include configuration data for configuring the various components of the virtualization software 605 (such as the MPSE 620 and the MPREs 630) and/or the virtual machines 611-614. In the example illustrated in FIG. 6, the controller agent 640 receives control plane messages from the controller cluster 660 from the physical network 690 and in turn provides the received configuration data to the MPREs 630 through a control channel without going through the MPSE 620. However, in some embodiments, the controller agent 640 receives control plane messages from a direct data conduit (not illustrated) independent of the physical network 690. In some other embodiments, the controller agent 640 receives control plane messages from the MPSE 620 and forwards configuration data to the router 630 through the MPSE 620.

In some embodiments, the controller agent 640 receives the multicast group information from the SDN controller and uses the multicast group information to map multicast group identifiers from overlay to underlay, and to identify which VTEPs are interested in which multicast group. The controller agent 640 also uses the multicast group information to distinguish VTEPs that are in the same network segment as the current host machine from VTEPs that are not in the same network segment. Based on the received multicast group information, the host machine 600 encapsulates multicast packets with underlay multicast group identifier, and sends multicast packet to VTEPs in different network segments by unicast.

The network data storage 645 in some embodiments stores some of the data that are used and produced by the logical forwarding elements of the host machine 600 (logical forwarding elements such as the MPSE 620 and the MPRE 630). Such stored data in some embodiments include forwarding tables and routing tables, connection mappings, as well as packet traffic statistics. These stored data are accessible by the controller agent 640 in some embodiments and delivered to another computing device (e.g., SDN controller 300.)

The MPSE 620 delivers network data to and from the physical NIC 695, which interfaces the physical network 690. The MPSE 620 also includes a number of virtual ports (vPorts) that communicatively interconnect the physical NIC 695 with the VMs 611-614, the MPREs 630, and the controller agent 640. Each virtual port is associated with a unique L2 MAC address, in some embodiments. The MPSE 620 performs L2 link layer packet forwarding between any two network elements that are connected to its virtual ports. The MPSE 620 also performs L2 link layer packet forwarding between any network element connected to any one of its virtual ports and a reachable L2 network element on the physical network 690 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 630 perform L3 routing on data packets received from a virtual port on the MPSE 620. In some embodiments, this routing operation entails resolving a L3 IP address to a next-hop L2 MAC address and a next-hop VNI (i.e., the VNI of the next-hop's L2 segment). Each routed data packet is then sent back to the MPSE 620 to be forwarded to its destination according to the resolved L2 MAC address. This destination can be another VM connected to a virtual port on the MPSE 620, or a reachable L2 network element on the physical network 690 (e.g., another VM running on another host, a physical non-virtualized machine, etc.).

As mentioned, in some embodiments, MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router" and a MPSE is referred to as a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or a local MPSE running in each host machine.

In some embodiments, the MPRE 630 includes one or more logical interfaces (LIFs) that each serve as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order to indicate in which host machine the MPRE operates.

The uplink module 670 relays data between the MPSE 620 and the physical NIC 695. The uplink module 670 includes an egress chain and an ingress chain that each perform a number of operations. Some of these operations are pre-processing and/or post-processing operations for the MPRE 630.

As illustrated by FIG. 6, the virtualization software 605 has multiple MPREs 630 for multiple, different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE, and hence a same L2 MAC address (vMAC or pMAC). In some other embodiments, each different MPRE belonging to a different tenant has its own port to the MPSE.

The MPSE 620 and the MPRE 630 make it possible for data packets to be forwarded amongst VMs 611-614 without being sent through the external physical network 690 (so long as the VMs connect to the same logical network, as different tenants' VMs will be isolated from each other). Specifically, the MPSE 620 performs the functions of the local logical switches by using the VNIs of the various L2 segments (i.e., their corresponding L2 logical switches) of the various logical networks. Likewise, the MPREs 630 perform the function of the logical routers by using the VNIs of those various L2 segments. Since each L2 segment/L2 switch has its own a unique VNI, the host machine 600 (and its virtualization software 605) is able to direct packets of different logical networks to their correct destinations and effectively segregate traffic of different logical networks from each other.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
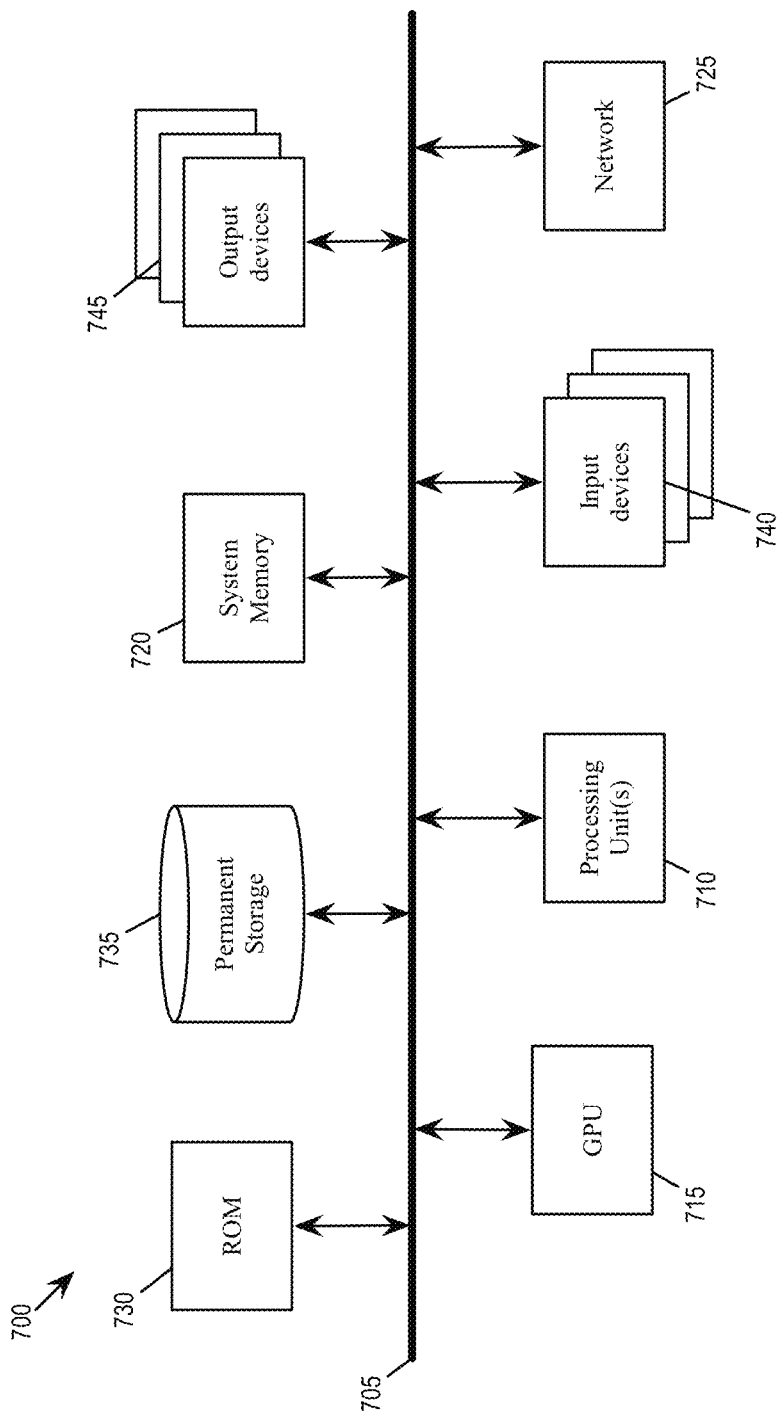
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above-described processes. This computer system 700 includes various types of non-transitory machine-readable media and interfaces for various other types of machine-readable media. Computer system 700 includes a bus 705, processing unit(s) 710, a system memory 720, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 720, and the permanent storage device 735.

From these various memory units, the processing unit(s) 710 retrieve instructions to execute and data to process in order to execute the processes of the invention. The processing unit(s) 710 may be a single processor or a multi-core processor in different embodiments. The read-only-memory (ROM) 730 stores static data and instructions that are needed by the processing unit(s) 710 and other modules of the computer system 700. The permanent storage device 735, on the other hand, is a read-and-write memory device. This device 735 is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device 735. Like the permanent storage device 735, the system memory 720 is a read-and-write memory device. However, unlike storage device 735, the system memory 720 is a volatile read-and-write memory, such a random access memory. The system memory 720 stores some of the instructions and data that the processor needs at runtime. In some embodiments, the invention's processes are stored in the system memory 720, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the computer system 700. The input devices 740 include alphanumeric keyboards and pointing devices (also called "cursor control devices"). The output devices 745 display images generated by the computer system 700. The output devices 745 include printers and display devices, such as cathode ray tubes (CRT) or liquid crystal displays (LCD). Some embodiments include devices such as a touchscreen that function as both input and output devices 740 and 745.

Finally, as shown in FIG. 7, bus 705 also couples computer system 700 to a network 725 through a network adapter (not shown). In this manner, the computer 700 can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
at a first host machine of a plurality of host machines:
receiving a multicast packet having an overlay multicast group identifier, wherein each of the plurality of host machines implements first-tier and second-tier edge routers through which packets pass through successively to enter an overlay network and to exit the overlay network, each host machine addressable by a unique virtual tunnel endpoint (VTEP), wherein a particular first-tier edge router implemented on the first host machine is a multicast querier of a first network segment associated with the multicast packet;
mapping the overlay multicast group identifier to an underlay multicast group identifier;
encapsulating the multicast packet with an encapsulation header that includes the underlay multicast group identifier to create an encapsulated multicast packet; and
forwarding the encapsulated multicast packet to a physical switch of the first network segment, wherein the physical switch sends copies of the encapsulated multicast packet to a set of second-tier edge routers that are implemented at a set of other host machines and that are determined to be interested in the underlay multicast group identifier.

2. The method of claim 1, wherein the multicast packet is received from an overlay network and the first host machine hosts a second-tier edge router that serves data traffic to and from the overlay network.

3. The method of claim 1, wherein:
the particular first-tier edge router serves data traffic to and from an external network; and
the multicast packet is received from the external network and the first host machine hosts the particular first-tier edge router.

4. The method of claim 3, wherein the particular first-tier edge router is actively serving data traffic to and from the external network and other first-tier edge routers implemented by other host machines are standing by and not actively serving data traffic to and from the external network.

5. The method of claim 3, wherein the particular first-tier edge node
(i) receives the multicast packet having the overlay multicast group identifier from the external network;
(ii) maps the overlay multicast group identifier to the underlay multicast group identifier;
(iii) encapsulates the multicast packet with the encapsulation header that includes the underlay multicast group identifier; and
(iv) forwards the encapsulated multicast packet to the physical switch of the first network segment, wherein the physical switch sends the copies of the encapsulated multicast packet at one or more ports to the set of host machines having the second-tier edge routers that are determined to be interested in the underlay multicast group identifier.

6. The method of claim 3, wherein the particular first-tier edge router receives a copy of the encapsulated multicast packet from the physical switch and forwards a decapsulated copy of the multicast packet to the external network without the underlay multicast group identifier.

7. The method of claim 1, wherein a second-tier edge router receiving a copy of the encapsulated multicast packet decapsulates the multicast packet to remove the underlay multicast group identifier and forwards the decapsulated multicast packet to an overlay network by multicast based on the overlay multicast group identifier.

8. The method of claim 1, wherein a network controller sends multicast grouping information associating an overlay multicast group identifier with (i) a corresponding underlay multicast group identifier and (ii) a list of VTEPs that are interested in the multicast group to each first-tier and second-tier edge routers.

9. The method of claim 8, wherein the network controller receives multicast reports associating VTEPs with overlay multicast group identifiers and generates the multicast grouping information based on the received multicast reports.

10. The method of claim 8, wherein the list of VTEPs that are interested in a multicast group sent to a particular second-tier edge router distinguishes (i) VTEPs connected to a same network segment as the particular second-tier edge router from (ii) VTEPs connected to a different network segment as the particular second-tier edge router.

11. The method of claim 1 further comprising identifying a VTEP at a second network segment having a second-tier edge router that is interested in the underlay multicast group identifier and forwarding the multicast packet to the identified VTEP by unicast.

12. The method of claim 1, wherein the particular first-tier edge router implemented by one of the plurality of host machines is a multicast querier of a network segment.

13. The method of claim 1, wherein the first-tier edge routers are provider edge routers and the second-tier edge routers are tenant edge routers.

14. A first host machine that is part of a plurality of host machines, the first host machine comprising:
   one or more processors; and
   a computer-readable storage medium storing a plurality of computer-executable components that are executable by the one or more processors to perform a plurality of actions, the plurality of actions comprising:
      receiving a multicast packet having an overlay multicast group identifier, wherein each of the plurality of host machines implements first-tier and second-tier edge routers through which packets pass through successively to enter an overlay network and to exit the overlay network, each host machine addressable by a unique virtual tunnel endpoint (VTEP), wherein a particular first-tier edge router implemented on the first host machine is a multicast querier of a first network segment associated with the multicast packet;
      mapping the overlay multicast group identifier to an underlay multicast group identifier;
      encapsulating the multicast packet with an encapsulation header that includes the underlay multicast group identifier to create an encapsulated multicast packet; and
      forwarding the encapsulated multicast packet to a physical switch of the first network segment, wherein the physical switch sends copies of the encapsulated multicast packet to a set of second-tier edge routers that are implemented at a set of other host machines and that are determined to be interested in the underlay multicast group identifier.

15. The first host machine of claim 14, wherein the particular first-tier edge router
   (i) receives the multicast packet having the overlay multicast group identifier from an external network;
   (ii) maps the overlay multicast group identifier to the underlay multicast group identifier;
   (iii) encapsulates the multicast packet with the encapsulation header that includes the underlay multicast group identifier; and
   (iv) forwards the encapsulated multicast packet to the physical switch of the first network segment, wherein the physical switch sends the copies of the encapsulated multicast packet at one or more ports to the set of host machines having the second-tier edge routers that are determined to be interested in the underlay multicast group identifier.

16. The first host machine of claim 14, wherein a second-tier edge router receiving a copy of the encapsulated multicast packet decapsulates the multicast packet to remove the underlay multicast group identifier and forwards the decapsulated multicast packet to an overlay network by multicast based on the overlay multicast group identifier.

17. The first host machine of claim 14, wherein a network controller sends multicast grouping information associating an overlay multicast group identifier with (i) a corresponding underlay multicast group identifier and (ii) a list of VTEPs that are interested in the multicast group to each first-tier and second-tier edge routers.

18. The first host machine of claim 17, wherein the network controller receives multicast reports associating VTEPs with overlay multicast group identifiers and generates the multicast grouping information based on the received multicast reports.

19. The first host machine of claim 17, wherein the list of VTEPs that are interested in a multicast group sent to a particular second-tier edge router distinguishes (i) VTEPs connected to a same network segment as the particular second-tier edge router from (ii) VTEPs connected to a different network segment as the particular second-tier edge router.

20. The first host machine of claim 14, wherein the plurality of actions further comprises identifying a VTEP at a second network segment having a second-tier edge router that is interested in the underlay multicast group identifier and forwarding the multicast packet to the identified VTEP by unicast.

21. The first host machine of claim 14, wherein the particular first-tier edge router implemented by one of the plurality of host machines is a multicast querier of a network segment.

* * * * *